United States Patent
Stumpf et al.

(10) Patent No.: US 12,474,361 B2
(45) Date of Patent: Nov. 18, 2025

(54) PIPETTING TIP SCANNER

(71) Applicant: TECAN TRADING AG, Männedorf (CH)

(72) Inventors: Max Stumpf, Zürich (CH); Volfgang Vilaj, Uetikon am See (CH)

(73) Assignee: TECAN TRADING AG, Männedorf (CH)

( * ) Notice: Subject to any disclaimer, the term of this patent is extended or adjusted under 35 U.S.C. 154(b) by 344 days.

(21) Appl. No.: 18/089,178

(22) Filed: Dec. 27, 2022

(65) Prior Publication Data
US 2023/0204617 A1 Jun. 29, 2023

(30) Foreign Application Priority Data
Dec. 29, 2021 (EP) .................................... 21218140

(51) Int. Cl.
*G01N 35/00* (2006.01)
*G01N 35/10* (2006.01)

(52) U.S. Cl.
CPC ..... *G01N 35/1011* (2013.01); *G01N 35/0099* (2013.01)

(58) Field of Classification Search
CPC .................. G01N 35/1011; G01N 35/0099
See application file for complete search history.

(56) References Cited

U.S. PATENT DOCUMENTS

| 2004/0267405 | A1* | 12/2004 | Ingenhoven | ........... | B25J 19/021 |
| | | | | | 700/245 |
| 2020/0191812 | A1 | 6/2020 | Dilks | | |
| 2020/0376672 | A1* | 12/2020 | Wolf | ................... | G01B 11/24 |

FOREIGN PATENT DOCUMENTS

| EP | 3666379 | A1 | | 6/2020 | | |
| EP | 3745081 | B1 | * | 3/2023 | ........... | B25J 19/021 |
| WO | 2012158308 | A2 | | 11/2012 | | |
| WO | 2019025747 | A1 | | 2/2019 | | |

OTHER PUBLICATIONS

Extended European Search Report and Written Opinion for EP application No. EP 21218140.8, dated Jul. 1, 2022.
Park, Chan-Young, et al.; "Automated pipette failure monitoring using image processing for point-of-care testing devices"; Biomedical Engineering OnLine 2018; 17(Supp 2):93-103, retrieved Dec. 6, 2022.

* cited by examiner

*Primary Examiner* — Jamel E Williams
(74) *Attorney, Agent, or Firm* — Notaro, Michalos & Zaccaria P.C.

(57) ABSTRACT

A method of measuring the alignment of one or more pipetting tips in an automated pipetting system where the one or more pipetting tips are mounted on one or more adapters of a pipetting head approximately perpendicular to the pipetting head mounting surface is disclosed. The orifices at the end of the one or more pipetting tips are mapped with an image capture device having a sensor placed in face and distant of the orifices. The method sends the acquired data from mapping the orifices of the one or more pipetting tips to the data processor, generating an image of the orifices of the one or more pipetting tips, determining the center positions of orifices, and delivering alignment information for the one or more pipetting tips.

16 Claims, 3 Drawing Sheets

PIPETTING TIP SCANNER

TECHNICAL FIELD OF THE INVENTION

The present invention relates generally to a method and system for contactless measurement of an array of objects and for confirming the correct positioning of objects in an automated system. Specifically, the invention relates to a method and system for screening the pipetting tip positions in an automated pipetting system and for calculating and confirming the correct positioning of pipetting tips in an automated pipetting system.

DESCRIPTION OF THE RELATED ART

Contactless measurement systems use a range of physical properties to sense the environment, e.g., light, electricity, magnetic fields, and temperature. Contactless measurement systems can be used for laboratory automation arrangements, where they may be used for measuring and confirming the correct positioning of objects, and where contactless measurement systems are essential for a constant monitoring of a number of parameters. In many of these applications, especially when working with biologic or hazardous samples, it is important that the measurement system used is contactless. The risk for contamination can be kept minimal or can be eliminated completely, depending on the requirements. Contactless measurement systems can for example detect liquid levels in tubes and microwell plates, or it can sense the temperature of liquids. It may be desirable to measure the position of labware before a protocol is started. This can help to avoid the abandonment of a procedure and having to go back to the beginning of a protocol which comes with a loss of time and material. When working with smallest amounts of for example biologic material, as can be the case in forensics or tumor detection, a disruption due to a misalignment of laboratory equipment can be a most damaging event. In high-throughput laboratory protocols, pipetting in and out of multi-well plates, e.g., 96-well or 384-well plates, can be done with pipetting arrangements allowing the mounting of up to 96 or 384 pipettes at a time. These numerous pipettes in close proximity have to be mounted on the moveable robotic arm so that they are arranged in a parallel fashion and perpendicular to the working table. If one pipetting tip is slightly bent or not aligned properly, this may be enough to lead to the disruption mentioned above. To detect such deviations before the run is started, the coordinates of the lower ends of the pipetting tips, also called orifices, may be measured. US20200191812A1 addresses an image capture device for capturing images of barcodes of test tubes in a test tube rack, for use with automated robotic systems used in research and analytic laboratories in pharmaceutical, biotechnology and veterinary industries. The image capture device has a transparent window adjacent to the test tube rack to be imaged. A lighting arrangement illuminates the barcodes, and a mirror is arranged to relay light rays reflecting from the barcodes to the camera. An interface is provided for outputting the captured image to a host computer for decoding of the barcodes.

WO 2012/158308 A2 addresses a system for tracking a position of a pipette with respect to a multi well plate targeted at applications for pipetting reagents, e.g., solid reagents such as pills, for use in immunoassays and DNA analysis in clinical diagnostics and forensic laboratories. This system tracks the dispensing and extracting of reagents to and from arrays of well locations. It selectively illuminates locations to indicate the progress of pipetting operations. A control logic (CPU or microcontroller) can guide the user through pipetting processes and indicate errors. A capacitive sensor detects positions of a pipette with respect to the locations in the area or with reference to X- and Y-axis. A control logic coupled to the sensor and a well designator develops the control signals in response to the detected positions. It has a touchscreen display with user-interface area.

This known solution for contactless measuring and tracking the position of pipetting tips in the state of the art is restricted to capturing the position of only one pipetting tip at a time. On the other hand, the known image capture device that may cover a larger area, namely a test tube rack, is constructed such that it captures images of barcodes of test tubes in a test tube rack only, while it does not calculate and confirm the correct positioning of an array of pipetting tips in an automated pipetting system.

SUMMARY OF THE INVENTION

It is thus an object of the present invention to provide for a method of measuring the alignment of one or more pipetting tips in an automated pipetting system and of delivering alignment information for the pipetting tips, and to provide for a contactless measurement system that allows to calculate, analyze, and confirm the correct positioning of an array of pipetting tips in an automated pipetting system.

This is solved by a method of measuring the alignment of one or more pipetting tips in an automated pipetting system according to claim 1, which comprises mapping the orifices at the protruding end of the one or more pipetting tips with an image capture device and sending the acquired data to a data processor. Further favorable embodiments can, for example, be derived from the respective dependent claims.

The method of measuring the alignment of one or more pipetting tips in an automated pipetting system according to the invention comprises mounting the one or more pipetting tips on one or more adapters of a pipetting head approximately perpendicular to the pipetting head mounting surface, mapping the orifices at the protruding end of the one or more pipetting tips with an image capture device comprising a sensor placed in face and distant of the orifices, sending the acquired data from mapping the orifices of the one or more pipetting tips to a data processor, generating an image of the orifices of the one or more pipetting tips, determining the center positions of orifices relative to the pipetting head, and calculating alignment information for the one or more pipetting tips with respect to a virtual regular grid assumed to the pipetting head mounting surface.

The contactless measurement system for measuring the alignment of one or more pipetting tips in an automated pipetting system according to the invention comprises one or more adapters on a pipetting head connected to a robotic pipetting arm for mounting the one or more pipetting tips, an image capture device comprising a sensor joined to a worktable for capturing an image of the orifices of the one or more pipetting tips or of the one or more adapters of the pipetting head, a data processor for receiving the image data acquired by the sensor and for calculating alignment information for the one or more pipetting tips with respect to a virtual regular grid assumed to the pipetting head mounting surface.

The computer program according to the invention comprises instructions which, when the program is executed by a data processor, cause an automated pipetting system to mount one or more pipetting tips on one or more adapters of a pipetting head mounting surface, map the orifices at the protruding end of the one or more pipetting tips with an image capture device comprising a sensor placed in face and distant of the orifices, send the acquired data from mapping the orifices of the one or more pipetting tips to a data processor, generate an image of the orifices of the one or more pipetting tips from said acquired data, determine the center positions of orifices relative to the pipetting head, and calculate alignment information for the one or more pipetting tips with respect to a virtual regular grid assumed to the pipetting head mounting surface.

The image capture device in combination with the robotic pipetting arm that can be controlled to move the one or more pipetting tips to a given distance from the image capture device have the advantage of allowing the automated pipetting system to automatically detect misaligned or bad tips (e.g., missing coaxiality or damaged orifices) before starting the pipetting protocol. This avoids disrupting and expensive crashes and overall increases the process security & reliability. In addition, feedback loops through active correction of tip positions enable pipetting into sub-standard well diameters or small targets.

The method of measuring the alignment of one or more pipetting tips in an automated pipetting system according to the invention comprises mapping the orifices at the protruding end of the one or more pipetting tips with an image capture device comprising a sensor.

A sensor according to the invention may be any image sensor or imager that detects and conveys information used to make an image by converting the variable attenuation of light waves into small bursts of current that convey the information. A sensor according to the invention may be a line sensor or active pixel image sensor and may be an electronic image sensor, e.g. a charge-coupled device (CCD) image sensor, a contact image sensor (CIS), or an active-pixel sensor (CMOS sensor), or any other sensor for capturing an image.

In an embodiment the method comprises scanning the orifices at the protruding end of the one or more pipetting tips with an image capture device comprising a sensor, whereas the pipetting head and/or the sensor are moved relative to one another.

The image capture device according to the invention may comprise a mechanism for moving the sensor relative to the pipetting head for scanning the orifices at the protruding end of the one or more pipetting tips or for scanning the one or more adapters of the pipetting head.

In an embodiment of the invention the image capture device comprises a mechanism for moving the sensor across an object, whereas the object may be orifices of the protruding end of one or more pipetting tips or adapters of a pipetting head. In this case the image capture device may progressively move across the object to capture an image of the object, as is the case in a document or flatbed scanner. Alternatively, the contactless measurement system may comprise an image capture device comprising a stationary sensor. In an embodiment according to the invention, the object is mapped while the sensor and the pipetting head are stationary. In an embodiment the movement of the pipetting head and/or the sensor relative to one another comes from the pipetting head, which is progressively moved across the fixed sensor. In this case, the pipetting head is moved by the robotic pipetting arm of the automated pipetting system. The sensors thereby pick up variations in light intensity and convert them into electronic signals.

Alternatively, the image capture device according to the invention may comprise a mechanism that moves the laser light of a laser profiler progressively across an object. In this case, laser displacement sensors apply triangulation by combining the emitting element and the position sensitive device (PSD) to detect the amount of displacement. Data enabling 2D and 3D measurements, such as height difference, width, or angle, is collected across a laser line that is focused through the emitting lens and projected on an object, e.g. pipetting tips or adapters.

In an embodiment according to the invention the pipetting head and/or the sensor are moved relative to one another with a known temporal profile of relative positions. Thereby positions of the pipetting head and the sensor relative to one another are known in relation to time and at any given time throughout the movement process. This information may be processed together with the image data and any other relevant information by the data processor.

A digitizer processes the sensor signal, turning it into a stream of numbers that indicate the brightness or darkness of points on the object. The scanner's interface transmits these numbers to a computer, which operating system installs the appropriate drivers for the scanner. An object-processing application program communicates with the operating system, which accesses drivers and runs the scanner. An application program receives image data from the scanner and performs calculation processes.

In an embodiment of the invention, the image capture device is a flatbed document scanner. A flatbed scanner typically has a glass window, that is the surface where the object to be scanned is placed. The graphic or object will be placed on top of the glass. A flatbed scanner may be a high speed barcode reader made for quickly decoding tube 2D barcodes, any document scanner or any line scanning device.

The scanner according to the invention may comprise a light source for illuminating the object to be scanned. The light source may be a light emitting diode (LED), a cold cathode fluorescent lamp (CCFL), a xenon lamp, or as is common in older scanners, a standard fluorescent lamp. A diffusor in front of the light source may be applied to homogenize the illumination.

This light may be regulated by a voltage regulator or a similar device. This enables the light to spread evenly across the document or object. A beam-splitter may be used to obtain a common optical path for illumination and light detection within the scanner.

An embodiment of a contactless measurement system according to the invention comprises an image capture device comprising an optical subsystem reflecting the object to be mapped onto the sensor. Such an optical subsystem may comprise one or more mirrors, filters and/or lenses.

The image capture device in an embodiment of the invention may comprise a series of mirrors, filters and lenses, and a sensor (e.g., a charge-coupled device (CCD) array), making up the scan head.

The core component of the scanner is the sensor or CCD array, respectively. CCD is the most common technology for image capture in scanners. It is a collection of tiny light-sensitive diodes called photosites, which convert photons (light) into electrons (electrical charge). Each photosite is sensitive to light. The brighter the light that hits a single photosite, the greater the electrical charge that will accumulate at that site. CCD sensors are a major technology used in digital imaging.

CCD is an integrated circuit containing an array of linked, or coupled, capacitors. Under the control of an external circuit, each capacitor can transfer its electric charge to a neighboring capacitor. A CCD array is part of the scan head rolls or moves over the entire document or object.

The scan head may be fixed to a bar that acts like a stabilizer and moves the scan head across the object by a belt that is attached to a DC electric motor (e.g., a stepper motor). An angled mirror reflects the image of the object on another mirror. In some scanners, there are only two mirrors while others use a three or more mirror approach. Each mirror is slightly curved to focus the image it reflects onto a smaller surface. The last mirror reflects the image onto a lens. The lens focuses the image through a filter on the CCD array. Most scanners today use the single pass method. Pass means that the scan head has completed a single complete scan of the document or object. The lens splits the image into three smaller versions of the original. Each smaller version passes through a color filter (either red, green or blue) onto a discrete section of the CCD array. The scanner combines the data from the three parts of the CCD array into a single full-color image.

Once in the CCD array, the image is transferred to and gets decoded by a data processor, which reflects the object on a screen or calculates the position of an object, e.g. the position of the one or more pipetting tips.

Another imaging array technology that has become popular in inexpensive flatbed scanners is contact image sensor (CIS). CIS replaces the CCD array, mirrors, filters, lamp and lens with rows of red, green and blue LEDs. The image sensor mechanism, consisting of 300 to 600 sensors spanning the width of the scan area, is placed very close to the glass plate that the document or object rests upon. When the image is scanned, the LEDs combine to provide white light. The illuminated image is then captured by the row of sensors. CIS scanners are cheaper, lighter and thinner, but do not provide the same level of quality and resolution found in most CCD scanners.

The connection for data transfer between the image capture device and the data processor according to the invention may comprise wires, electrical boards, any electrically conductive material, or may apply any means for data transfer including wireless technology.

In a method according to an embodiment of the invention, a cross-correlation matrix is created from the scanned image and a template of a pipetting tip. The center positions of orifices of the one or more pipetting tips are then determined the by sub-pixel interpolation of peaks in the cross-correlation matrix.

In another embodiment according to the invention the center positions of orifices relative to the pipetting head is determined by sub-pixel interpolation of peaks or a pattern found in the image of the orifices generated.

In a method according to an embodiment of the invention, alignment information for the one or more pipetting tips is calculated with respect to a virtual regular grid assumed to the pipetting head mounting surface. A regular grid is a grid whose grid lines have a constant distance along each grid axis. The virtual regular grid assumed to the pipetting head mounting surface allows any point in space around the pipetting head mounting surface to be put in relation to the pipetting head, allowing the calculation of alignment information for the one or more pipetting tips with respect to the pipetting head.

In a method according to an embodiment of the invention, calculating alignment information for the one or more pipetting tips comprises converting the sub-pixel positions into positions in a measure of length.

A measure of length according to the invention may be any unit of length measurement in the metric (international system, SI) or non-metric system (e.g., imperial system). A measure of length according to the invention may therefore be meters (m) or inches but is most likely to be millimeters (mm).

In a method according to an embodiment of the invention, calculating alignment information for the one or more pipetting tips comprises calibrating the sensor with a calibrated image on an axis parallel to the pipetting head and perpendicular to the movement axis of the pipetting head and/or the sensor relative to one another.

In a method according to an embodiment of the invention, the one or more adapters of the pipetting head are mapped with an image capture device comprising a sensor. In an embodiment, the one or more adapters of the pipetting head are scanned with an image capture device comprising a sensor by moving the pipetting head and/or the sensor relative to one another. The acquired data is then sent to the data processor, which calculates positions of the one or more adapters. By using this information together with the acquired data from mapping the one or more pipetting tips, the center positions of orifices of the one or more pipetting tips are determined and/or the alignment of the one or more pipetting tips with respect to the one or more adapters of the pipetting head are calculated. The steps of mapping or scanning the one or more adapters of the pipetting head may be performed before, between, or after any mapping of the orifices of the one or more pipetting tips.

In an embodiment of the contactless measurement system for measuring the alignment of one or more pipetting tips in an automated pipetting system according to the invention, the contactless measurement system comprises one or more adapters on a pipetting head connected to a robotic pipetting arm for mounting the one or more pipetting tips approximately perpendicular to the pipetting head, an image capture device comprising a sensor joined to a worktable for capturing an image of the orifices of the one or more pipetting tips or of the one or more adapters of the pipetting head, a data processor for receiving the image data acquired by the sensor and for calculating alignment information for the one or more pipetting tips with respect to a virtual regular grid assumed to the pipetting head mounting surface.

Joined to a worktable according to the invention may be any form of connection to a worktable. The image capture device may be placed on top of the worktable, may be attached in an opening of the worktable or may be fastened underneath the worktable with an opening in the worktable allowing the robotic arm to access the image capture device.

In an embodiment of the contactless measurement system according to the invention, the contactless measurement system further comprises a mechanism for moving the pipetting head and/or the sensor relative to one another for scanning the orifices at the protruding end of the one or more pipetting tips or of the one or more adapters of the pipetting head.

The contactless measurement system according to the invention may comprise an image capture device that is arranged perpendicular to the one or more pipetting tips.

The contactless measurement system according to the invention may comprise a light source and one or more mirrors reflecting the image onto the sensor.

In an embodiment of the invention, the image capture device comprises a movement mechanism for moving a scan head, which holds the sensor and a light source at a distance and angle relative to each other. The scan head can be of any material and shape. It is part of the image capture device and allows to move several components together (e.g., sensor, light source, mirror).

In an embodiment of the contactless measurement system according to the invention, the image capture device comprises a laser profiler. The laser profiler may comprise a light source emitting a laser light and one or more laser displacement sensors.

In an embodiment of the contactless measurement system according to the invention, the robotic pipetting arm can be controlled to move the one or more pipetting tips to a given distance from the image capture device. In an embodiment of the invention, this distance is 0 to 4 mm. In another embodiment of the invention, this distance is 0.1 mm to 3 mm. In another embodiment of the invention, this distance is 0.2 mm to 2 mm.

The contactless measurement system according to an embodiment of the invention comprises a pipetting head that is a multichannel pipetting head.

The pipetting head mounting surface according to the invention is the pipetting head surface facing or comprising the adapters for mounting the one or more pipetting tips. In other words, it is the side of the pipetting head facing the one or more pipetting tips when mounted and facing the image capture device. The pipetting head mounting surface according to the invention may be of any shape, however when it holds more than one adapter, it may comprise a plane. That plane may be parallel to the movement axis of the pipetting head and/or the sensor relative to one another.

The computer program according to the invention comprises instructions which, when the program is executed by a data processor, cause an automated pipetting system to mount one or more pipetting tips on one or more adapters of a pipetting head mounting surface, map the orifices at the protruding end of the one or more pipetting tips with an image capture device comprising a sensor placed in face and distant of the orifices, send the acquired data from mapping the orifices of the one or more pipetting tips to the data processor, generate an image of the orifices of the one or more pipetting tips from said acquired data, determine the center positions of orifices relative to the pipetting head, and calculate alignment information for the one or more pipetting tips with respect to a virtual regular grid assumed to the pipetting head mounting surface.

In an embodiment according to the invention the computer program comprises instructions which, when the program is executed by a data processor, cause an automated pipetting system to scan the orifices at the protruding end of the one or more pipetting tips with the image capture device comprising a sensor placed in face and distant of the orifices by moving the pipetting head and/or the sensor relative to one another.

In an embodiment according to the invention the computer program comprises instructions which, when the program is executed by a data processor, cause an automated pipetting system to create a cross-correlation matrix from the scanned image and a template of a pipetting tip, and determine the center positions of orifices of the one or more pipetting tips by sub-pixel interpolation of peaks or a pattern found in an image of the orifices generated.

The computer program in an embodiment according to the invention further comprises instructions which, when the program is executed by a data processor, cause an automated pipetting system to convert the sub-pixel positions into positions in a measure of length.

In an embodiment according to the invention the computer program comprises instructions which, when the program is executed by a data processor, cause an automated pipetting system to scan the one or more adapters of the pipetting head with an image capture device comprising a sensor by moving the pipetting head and/or the sensor relative to one another, send the acquired data from scanning the one or more adapters to the data processor, calculate positions of the one or more adapters in relation to the pipetting head, and use this information to determine the center positions of orifices of the one or more pipetting tips and/or calculate the alignment of the one or more pipetting tips with respect to the one or more adapters of the pipetting head.

The solution according to the invention, at least in preferred embodiments, inter alia achieves the following advantages:

The contactless measurement system and method for analyzing the alignment of pipetting tips in an automated pipetting system allow measurements of an array or pipetting tips at once. Moreover, image capture devices like flatbed scanners are fast and possess a high lateral resolution at the same time.

Together this ensures fast and reliable measurements of pipetting tip positions and alignment that can be run before the use of any new pipetting tip. This guarantees that the subsequent pipetting step can be performed without the risk of having to abandon the protocol due to misaligned or missing pipetting tips, resulting in much safer procedures and less wasted material, which can be extremely precious.

Another advantage comes from the simple inexpensive setup made of only a few parts. Having to abandon automated pipetting protocols can also cause consequential costs for damages to the robot or for time and material lost.

Therefore the contactless measurement system and method for analyzing the alignment of pipetting tips in an automated pipetting system according to the invention are also less expensive because they are more reliable and safer.

Overall an automated pipetting system comprising a contactless measurement system according to the invention will consequently be faster and more reliable, use less material, have a prolonged lifespan, causing less work and lower operating costs.

Furthermore, advantages and conveniences of the invention result from the following description of embodiments based on the drawings.

BRIEF DESCRIPTION OF THE DRAWINGS

The invention will be described in detail with respect to the drawings schematically depicting embodiments of the invention. These are for illustrative purposes only and are not to be construed as limiting. In detail.

DETAILED DESCRIPTION OF THE FIGURES

Figure 1:
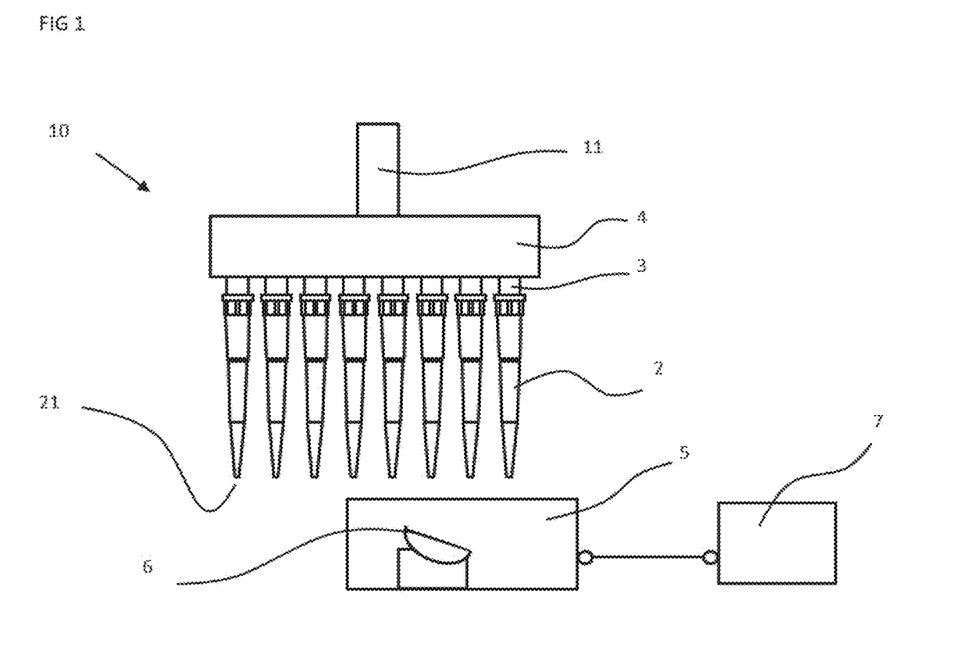
FIG. 1 shows a schematic full sectional view of an embodiment of a contactless measurement system for analyzing the position of pipetting tips in an automated pipetting system.

FIG. 1 shows a schematic full sectional view of an embodiment of a contactless measurement system 10 for measuring the alignment of one or more pipetting tips 2 in an automated pipetting system 1 comprising one or more adapters 3 on a pipetting head 4 connected to a robotic pipetting arm 11 for mounting the one or more pipetting tips 2 approximately perpendicular to the pipetting head 4, an image capture device 5 comprising a sensor 6 for capturing an image of the orifices 21 of the one or more pipetting tips 2 or of the one or more adapters 3 of the pipetting head 4. The sensor 6 may be a charge-coupled device image sensor (CCD) or contact image sensor (CIS), or any other appropriate sensor.

The contactless measurement system 10 further comprises a data processor 7 for receiving the image data acquired by the sensor 6 and for calculating alignment information for the one or more pipetting tips 2 with respect to a virtual regular grid assumed to the pipetting head 4 mounting surface.

The pipetting head 4 and/or the sensor 6 can move relative to one another so that the orifices 21 of the one or more pipetting tips 2 or of the one or more adapters 3 of the pipetting head 4 can be scanned by the image capture device 5.

The stream of numbers, i.e. the image data captured, is transmitted to the data processor 7.

The figure schematically shows a wire connection between the image capture device 5 and the data processor 7, however any means for data transfer, including wireless technology may be applied in any embodiment according to the invention. The data processor 7 comprises an operating system which installs the appropriate drivers for the image capture device 5. An application program receives the image data from the image capture device 5 and performs calculation processes. The data processor 7 generates an image of the orifices 21 of the one or more pipetting tips 2, determines the center positions of orifices 21, and delivers alignment information for the one or more pipetting tips 2. The data processor 7 may additionally create a cross-correlation matrix from the scanned image and a template of a pipetting tip, and determine the center positions of orifices 21 of the one or more pipetting tips 2 by sub-pixel interpolation of peaks in the cross-correlation matrix. The sub-pixel positions may be converted into positions in a measure of length, and the data processor 7 may calculate alignment information for the one or more pipetting tips 2 with respect to a virtual regular grid assumed to the pipetting head 4 mounting surface.

Figure 2:
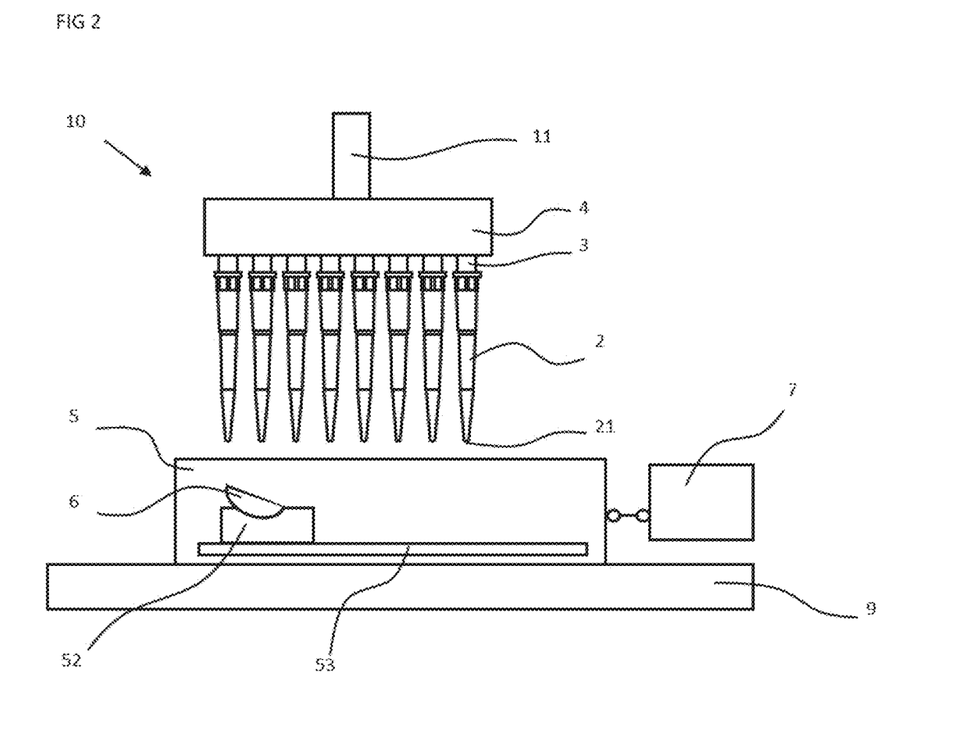
FIG. 2 shows a schematic full sectional view of an embodiment of a contactless measurement system comprising an image capture device with a scan head and movement mechanism on a worktable.

FIG. 2 shows a schematic full sectional view of an embodiment of a contactless measurement system 10 for measuring the alignment of one or more pipetting tips 2 in an automated pipetting system 1 comprising a scan head 52 and a movement mechanism 53 for progressively repositioning the sensor 6 across the one or more pipetting tips 2 to capture an image. Also, the embodiment shown comprises a worktable 9 on which an image capture device 5 is arranged. According to the invention any form of connection to a worktable 9 may be possible. The image capture device 5 may be placed on top of the worktable 9 as shown or may be attached in an opening of the worktable 9 or be fastened underneath the worktable 9 with an opening in the worktable 9 allowing the robotic pipetting arm 11 to access the image capture device 5.

In the embodiment of a contactless measurement system 10 shown, adapters 3 for mounting the one or more pipetting tips 2 approximately perpendicular to a pipetting head 4 are connected through the pipetting head 4 to a robotic pipetting arm 11. The image capture device 5 comprises a sensor 6 for capturing an image of the orifices 21 of the pipetting tips 2 or of the adapters 3 of the pipetting head 4. The sensor 6 may be a CCD array or CIS, or any other appropriate sensor. The sensor 6 is part of the scan head 52 and rolls or moves over the object. The scan head 52 may be fixed to the movement mechanism 53, which may be a bar that acts like a stabilizer and moves the scan head 52 progressively across the one or more pipetting tips 2. The movement mechanism 53 may comprise a belt that is attached to a DC electric motor (e.g., a stepper motor) or may be any other mechanism for progressively moving the scan head 52 across an object. The scan head 52 may finish a complete scan of the document or object in a single pass (single pass method). The image capture device 5 may comprise an optical subsystem (not shown) reflecting the object to be scanned onto the sensor 6. Angled mirrors 63 may reflect the image of the object on other mirrors 63 (not shown). In some scanners, there are only two mirrors 63 while others use three or more mirror approaches. Each mirror 63 is slightly curved to focus the image it reflects onto a smaller surface, up to the last mirror 63 that reflects the image onto a lens. The lens focuses the image through a filter on the sensor 6 (e.g., a CCD array). A digitizer (not shown) processes the sensor signal, turning it into a stream of numbers that indicate the brightness or darkness of points on the object.

The stream of numbers, i.e. the image data captured, is transmitted to the data processor 7. The figure schematically shows a wire connection between the image capture device 5 and the data processor 7, however any means for data transfer, including wireless technology may be applied in any embodiment according to the invention. The data processor 7 comprises an operating system which installs the appropriate drivers for the image capture device 5. An application program receives the image data from the image capture device 5 and performs calculation processes. The data processor 7 generates an image of the orifices 21 of the one or more pipetting tips 2, determines the center positions of orifices 21, and delivers alignment information for the one or more pipetting tips 2. The data processor 7 may additionally create a cross-correlation matrix from the scanned image and a template of a pipetting tip 2, and determine the center positions of orifices 21 of the one or more pipetting tips 2 by sub-pixel interpolation of peaks in the cross-correlation matrix. The sub-pixel positions may be converted into positions in a measure of length, and the data processor 7 may calculate alignment information for the one or more pipetting tips 2 with respect to a virtual regular grid assumed to the pipetting head 4 mounting surface.

Figure 3:
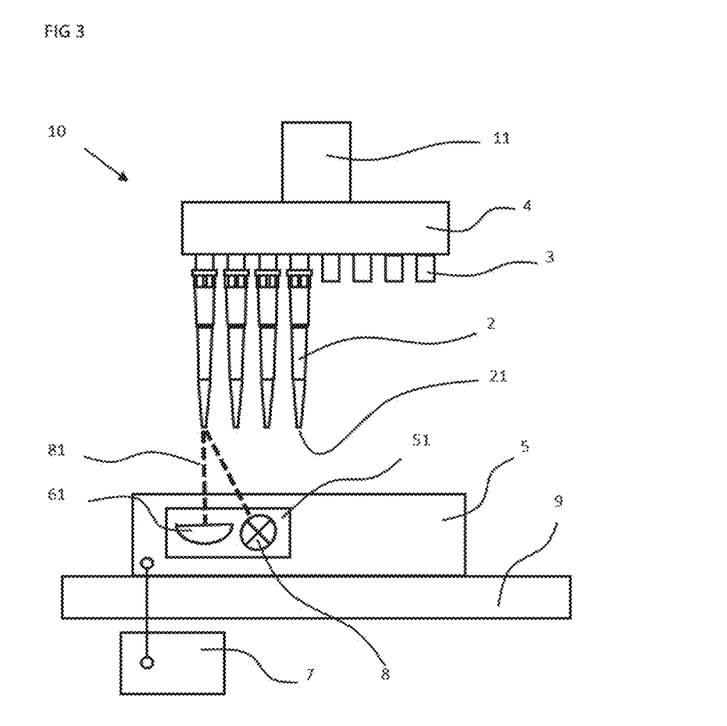
FIG. 3 shows a schematic full sectional view of an embodiment of a contactless measurement system comprising a laser profiler emitting a laser light, and a laser displacement sensor.

FIG. 3 shows a schematic full sectional view of an embodiment of a contactless measurement system 10 comprising a laser profiler 51 with a light source 8 emitting a laser light 81, and a laser displacement sensor 61. The image capture device 5 in the embodiment shown here comprises a laser profiler 51. The laser profiler 51 comprises a light source 8 for emitting a laser light 81 in the direction of the one or more pipetting tips 2. The reflection is recorded by a laser displacement sensor 61, which transfers the data to a data processor 7. The data processor 7 calculates the position of the one or more pipetting tips 2 in an automated pipetting system 1. The pipetting head 4 and/or the laser displacement sensor 61 in the laser profiler 51 can move relative to one another so that the orifices 21 of the one or more pipetting tips 2 or of the one or more adapters 3 of the pipetting head 4 can be scanned by the image capture device 5.

In this embodiment, one or more laser displacement sensors 61 apply triangulation by combining the emitting element and the position sensitive device (PSD) to detect the amount of displacement. Data enabling 2D and 3D measurements, such as height difference, width, or angle, is collected across a laser line that is focused through the emitting lens and projected on an object, e.g. pipetting tips 2 or adapters 3. The contactless measurement system 10 additionally comprises a data processor 7 for calculating the position of the one or more pipetting tips 2. The data enabling 2D and 3D measurements, i.e. the image data captured, is transmitted to the data processor 7. An application program receives the image data from the image capture device 5 and performs calculation processes. The figure schematically shows a wire connection between the image capture device 5 and the data processor 7, however any means for data transfer, including wireless technology may be applied in and embodiment according to the invention.

Figure 4:
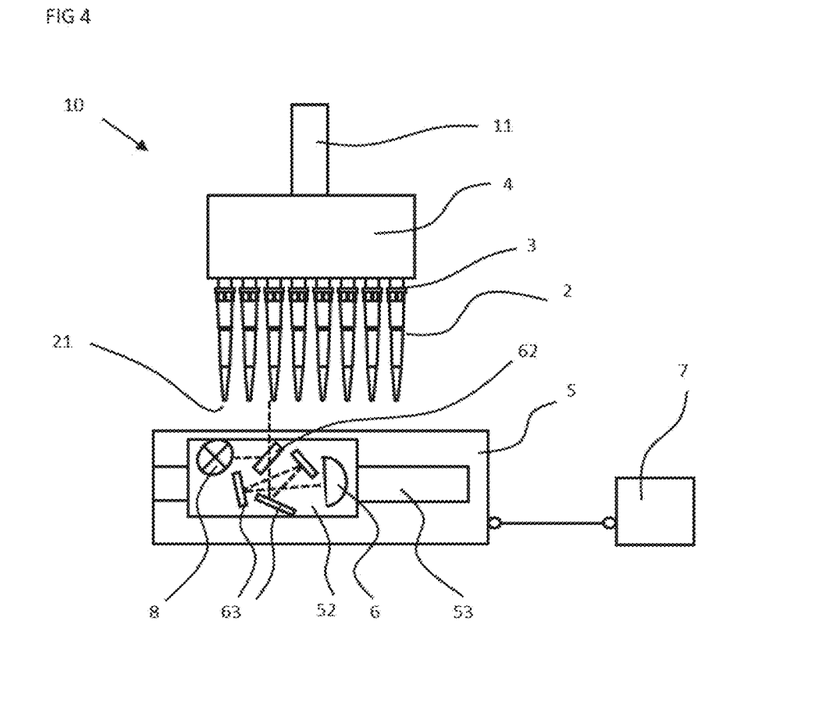
FIG. 4 shows a schematic full sectional view of an embodiment of a contactless measurement system comprising a scan head and a movement mechanism.

FIG. 4 shows a schematic full sectional view of an embodiment of a contactless measurement system 10 for measuring the alignment of one or more pipetting tips 2 in an automated pipetting system 1 comprising a scan head 52 and a movement mechanism 53 for progressively repositioning the scan head 52 across the one or more pipetting tips 2 to capture an image. Also, the embodiment shown comprises a worktable 9 on which an image capture device 5 is arranged. According to the invention any form of connection to a worktable 9 may be possible. The image capture device 5 may be placed on top of the worktable 9 as shown or may be attached in an opening of the worktable 9 or be fastened underneath the worktable 9 with an opening in the worktable 9 allowing the robotic arm 11 to access the image capture device 5.

In the embodiment of a contactless measurement system 10 shown, adapters 3 for mounting the one or more pipetting tips 2 approximately perpendicular to a pipetting head 4 are connected through the pipetting head 4 to a robotic pipetting arm 11. The image capture device 5 comprises a sensor 6 for capturing an image of the orifices 21 of the pipetting tips 2 or of the adapters 3 of the pipetting head 4. The sensor 6 may be a CCD array or CIS, or any other appropriate sensor. The sensor 6 is part of the scan head 52 and rolls or moves over the object. A beam-splitter 62 is arranged in the image capture device 5 such that a common optical path for illumination and light detection within the scanner is obtained. Angled mirrors 63 reflect the image of the object on other mirrors 63. In some scanners, there are only two mirrors 63 while others use three or more mirror 63 approaches. Each mirror 63 is slightly curved to focus the image it reflects onto a smaller surface, up to the last mirror 63 that reflects the image onto a lens (not shown). The lens focuses the image through a filter on the sensor 6. A digitizer (not shown) processes the sensor signal, turning it into a stream of numbers that indicate the brightness or darkness of points on the object.

The scan head 52 may be fixed to the movement mechanism 53, which may be a bar that acts like a stabilizer and moves the scan head 52 progressively across the one or more pipetting tips 2. The movement mechanism 53 may comprise a belt that is attached to a DC electric motor (e.g., a stepper motor), or may be any other mechanism for progressively moving the scan head 52 across an object. The scan head 52 may finish a complete scan of the document or object in a single pass (single pass method).

The stream of numbers, i.e. the image data captured, is transmitted to the data processor 7. The figure schematically shows a wire connection between the image capture device 5 and the data processor 7, however any means for data transfer, including wireless technology may be applied in any embodiment according to the invention. The data processor 7 comprises an operating system which installs the appropriate drivers for the image capture device 5. An application program receives the image data from the image capture device 5 and performs calculation processes. The data processor 7 generates an image of the orifices 21 of the one or more pipetting tips 2, determines the center positions of orifices 21, and delivers alignment information for the one or more pipetting tips 2. The data processor 7 may additionally create a cross-correlation matrix from the scanned image and a template of a pipetting tip, and determine the center positions of orifices 21 of the one or more pipetting tips 2 by sub-pixel interpolation of peaks in the cross-correlation matrix. The sub-pixel positions may be converted into positions in a measure of length, and the data processor 7 may calculate alignment information for the one or more pipetting tips 2 with respect to a virtual regular grid assumed to the pipetting head 4 mounting surface.

Figure 5:
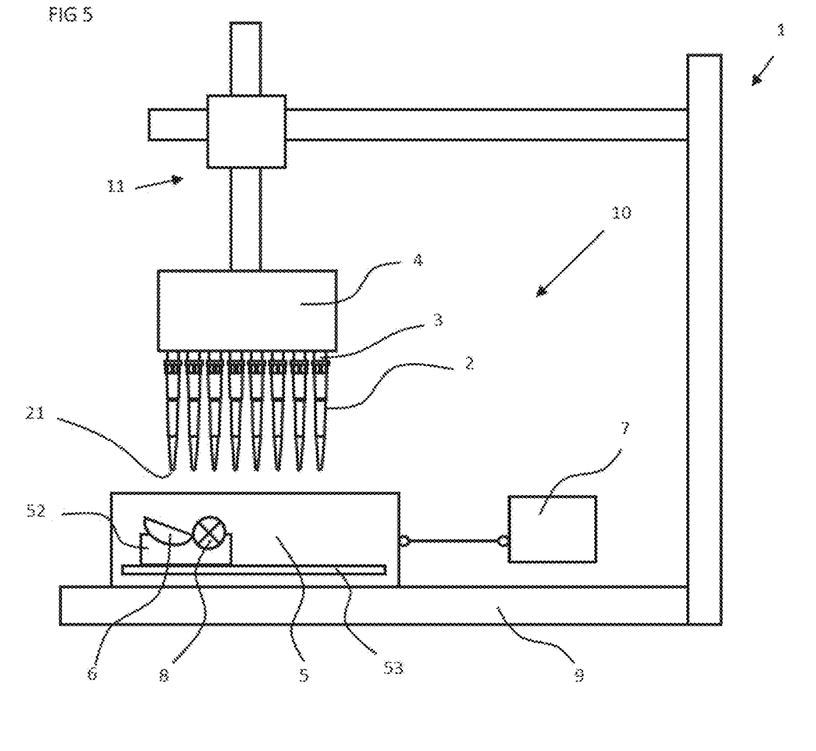
FIG. 5 shows a schematic full sectional view of an automated pipetting system comprising a contactless measurement system with a data processor for calculating the position of one or more pipetting tips.

FIG. 5 shows a schematic full sectional view of an automated pipetting system 1 comprising a contactless measurement system 10 according to the invention. The contactless measurement system 10 as shown comprises a data processor 7 for calculating the position of one or more pipetting tips 2. It further comprises pipetting tips 2 mounted on a robotic pipetting arm 11, a worktable 9 for holding labware and equipment, and an image capture device 5 arranged on said worktable 9. The worktable 9 according to the invention may hold the image capture device 5 by any means of connection. The image capture device 5 may be placed on top of the worktable 9 as shown or may be attached in an opening of the worktable 9 or be fastened underneath the worktable 9 with an opening in the worktable 9 allowing the robotic arm to access the image capture device 5.

The image capture device 5 shown comprises a light source 8, a sensor 6, and a movement mechanism 53 for progressively repositioning the light source 8 and the sensor 6 across the one or more pipetting tips 2 to capture an image. The movement mechanism 53 may be a bar that acts like a stabilizer applying a belt that is attached to a DC electric motor (e.g., a stepper motor) or may be any other mechanism for progressively moving the scan head 52 across an object.

The contactless measurement system 10 comprises a data processor 7 for calculating the position of the one or more pipetting tips 2. The stream of numbers, i.e. the image data captured, is transmitted to the data processor 7. An application program receives the image data from the image capture device 5 and performs calculation processes. The figure schematically shows a wire connection between the image capture device 5 and the data processor 7, however any means for data transfer, including wireless technology may be applied in any embodiment according to the invention.

Figure 6:
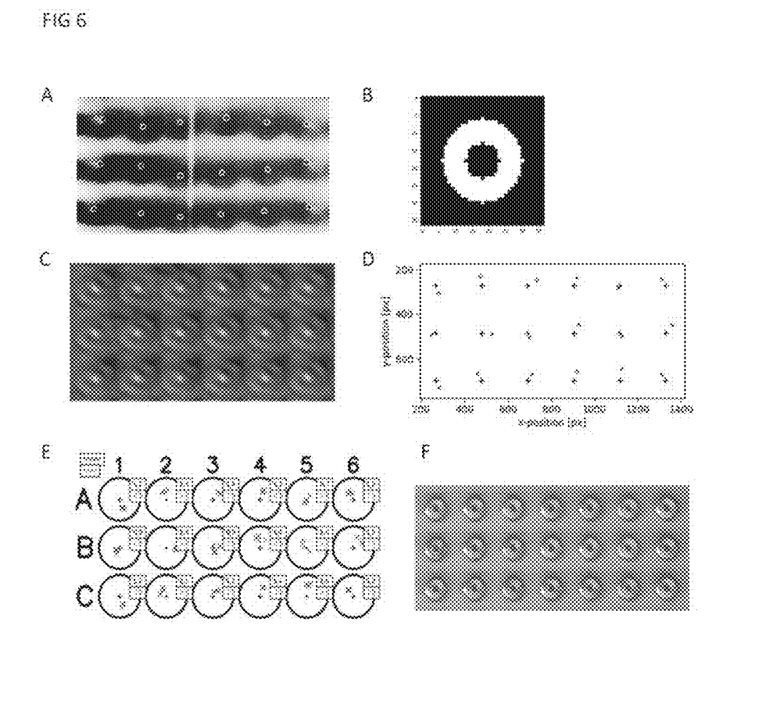
FIG. 6 shows a series of images that may be created by the data processor in the process of measuring the alignment of pipetting tips in an automated pipetting system.

FIG. 6 shows a series of images that may be created by the data processor 7 in the process of measuring the alignment of one or more pipetting tips 2 in an automated pipetting system 1. A computer program according to the invention may initiate the generation of images as shown. The automated pipetting system 1 comprising a contactless measurement system 10 according to the invention scans the orifices 21 of the one or more pipetting tips 2 or scans the one or more adapters 3 of a pipetting head 4 with an image capture device 5 comprising a sensor 6 by moving the pipetting head 4 and/or the sensor 6 relative to one another. The acquired data is sent to the data processor 7, which generates an image of the orifices 21 of the one or more pipetting tips 2 as shown in FIG. 6A.

A template of the pipetting tip 2 that will be detected is generated e.g. by reading the outside and inside diameters of the orifice 21 off the technical drawing of the corresponding pipetting tip 2, or by directly reading the diameters off the scanned image of the orifices 21 of several pipetting tips 2 as shown in FIG. 6A. Thereby, an image as shown in FIG. 6B is created, with a white ring on a black background representing the outer and inner diameters of the orifice 21. The image is converted into pixels, whereas the center of the orifice 21 may correspond to the center of the image. The example shown in FIG. 6B represents the orifice 21 of a standard disposable pipetting tip 2.

A cross-correlation matrix from the scanned image as shown in FIG. 6A and the template of a pipetting tip 2 as shown in FIG. 6B may then be created, resulting in an image corresponding to FIG. 6C. Alternatively, a protocol recognizing the circles stemming from the orifices 21 may be applied without the use of a cross-correlation matrix. The center positions of orifices 21 of the one or more pipetting tips 2 may be determined by sub-pixel interpolation of peaks in the cross-correlation matrix (FIG. 6C) or corresponding image. The data processor 7 may convert the sub-pixel positions into positions in a measure of length. A measure of length according to the invention may be any unit of length measurement in the metric (international system, SI) or non-metric system (e.g., imperial system). A measure of length according to the invention may be millimeters (mm).

The data processor 7 may estimate a grid by using this data together with information on the number and arrangement of adapters 3 on the pipetting head 4. For pipetting into a 96-well microplate the arrangement of adapters 3 on the pipetting head 4 may be an array or grid with 96 positions whereas the spacing of adapters 3 (point-to-point distance) is 9 mm, corresponding to a certain number of pixels, depending on the resolution chosen. The data processor 7 may then calculate alignment information for the one or more pipetting tips 2 with respect to the virtual regular grid assumed to the pipetting head 4 mounting surface. As shown in FIG. 6D the data processor 7 may represent the detected peaks (dots) next to the estimated grid (+ signs) in a nearest neighbor assignment, whereas the x- and y-positions are represented on a scale of pixels (px). The alignment information for the one or more pipetting tips 2 may also be shown after multiple sets of pipetting tips 2 have been analysed. The results of these multiple runs may be stacked and the result may be presented on top of the outline of a multiwell plate as shown in FIG. 6E. The plot of a multiple plate analysis shown in FIG. 6E includes the calculated maximum deviation (max, lower number) and mean (upper number) or median deviation. The circles shown correspond to wells A1 to A6, B1 to B6, and C1 to C6 of a 96-well plate.

Instead of estimating a grid by using the data generated by scanning the one or more pipetting tips 2, the one or more adapters 3 of the pipetting head 4 may be scanned by the image capture device 5. The acquired data from scanning the one or more adapters 3 is transferred the to the data processor 7, which may generate an image of the array of adapters 3 on the pipetting head 4 as shown in FIG. 6F. This image then serves as the basis for calculating positions of the one or more adapters 3 and for determining the center positions of orifices 21 of the one or more pipetting tips 2.

Incidentally it is also possible to implement the invention in a variety of variations in hereby shown examples and aspects of the invention highlighted above.

LIST OF REFERENCE SIGNS

1 automated pipetting system
10 contactless measurement system
11 robotic pipetting arm
2 pipetting tips
21 orifice
3 adapter
4 pipetting head
5 image capture device
51 laser profiler
52 scan head
53 movement mechanism
6 sensor
61 laser displacement sensor
62 beam-splitter
63 mirror
7 data processor
8 light source
81 laser light
9 worktable

What is claimed is:

1. A method of measuring the alignment of one or more pipetting tips (2) in relation to a pipetting head (4) in an automated pipetting system (1) comprising:
   mounting the one or more pipetting tips (2) on one or more adapters (3) of the pipetting head (4) approximately perpendicular to the pipetting head (4) mounting surface,
   mapping the orifices (21) at the protruding end of the one or more pipetting tips (2) with an image capture device (5) comprising a sensor (6) placed in face and distant of the orifices (21), comprising scanning the orifices (21) by moving the pipetting head (4) and/or the sensor (6) relative to one another,
   sending the acquired data from mapping the orifices (21) of the one or more pipetting tips (2) to a data processor (7),
   generating an image of the orifices (21) of the one or more pipetting tips (2) from said acquired data,
   determining the center positions of orifices (21) relative to the pipetting head (4), and
   calculating alignment information for the one or more pipetting tips (2) with respect to a virtual regular grid assumed to the pipetting head (4) mounting surface.

2. The method according to claim 1, further comprising:
   determining the center positions of orifices (21) relative to the pipetting head (4) by sub-pixel interpolation of peaks or a pattern found in said image of the orifices (21) generated.

3. The method according to claim 1, further comprising:
   moving the pipetting head (4) and/or the sensor (6) relative to one another with a known temporal profile of relative positions.

4. The method according to claim 1, whereas calculating alignment information for the one or more pipetting tips (2) comprises converting the sub-pixel positions into positions in a measure of length.

5. The method according to claim 1, whereas calculating alignment information for the one or more pipetting tips (2)

comprises calibrating the sensor (6) with a calibrated image on an axis parallel to the pipetting head (4) and perpendicular to the movement axis of the pipetting head (4) and/or the sensor (6) relative to one another.

6. The method according to claim 1, further comprising:
   creating a cross-correlation matrix from the scanned image and a template of a pipetting tip (2), and
   determining the center positions of orifices (21) of the one or more pipetting tips (2) by sub-pixel interpolation of peaks in the cross-correlation matrix.

7. The method according to claim 1, further comprising:
   scanning the one or more adapters (3) of the pipetting head (4) with an image capture device (5) comprising a sensor (6) by moving the pipetting head (4) and/or the sensor (6) relative to one another,
   sending the acquired data from scanning the one or more adapters (3) to the data processor (7),
   calculating positions of the one or more adapters (3) in relation to the pipetting head (4), and
   using this information to calculate the alignment of the one or more pipetting tips (2) with respect to the one or more adapters (3) of the pipetting head (4).

8. A computer program comprising instructions which, when the program is executed by a data processor (7), cause an automated pipetting system (1) to
   mount one or more pipetting tips (2) on one or more adapters (3) of a pipetting head (4) mounting surface,
   scan and map the orifices (21) at the protruding end of the one or more pipetting tips (2) with an image capture device (5) comprising a sensor (6) placed in face and distant of the orifices (21), by moving the pipetting head (4) and/or the sensor (6) relative to one another,
   send the acquired data from mapping the orifices (21) of the one or more pipetting tips (2) to a data processor (7),
   generate an image of the orifices (21) of the one or more pipetting tips (2) from said acquired data,
   determine the center positions of orifices (21) relative to the pipetting head (4), and
   calculate alignment information for the one or more pipetting tips (2) with respect to a virtual regular grid assumed to the pipetting head (4) mounting surface.

9. The computer program according to claim 8, further comprising instructions which, when the program is executed by a data processor (7), cause an automated pipetting system (1) to
   determine the center positions of orifices (21) relative to the pipetting head (4) by sub-pixel interpolation of peaks or a pattern found in said image of the orifices (21) generated, and
   convert the sub-pixel positions into positions in a measure of length.

10. The computer program according to claim 8, further comprising instructions which, when the program is executed by a data processor (7), cause an automated pipetting system (1) to
    create a cross-correlation matrix from the scanned image and a template of a pipetting tip (2), and
    determine the center positions of orifices (21) of the one or more pipetting tips (2) by sub-pixel interpolation of peaks in the cross-correlation matrix.

11. The computer program according to claim 8, further comprising instructions which, when the program is executed by a data processor (7), cause an automated pipetting system (1) to
    scan the one or more adapters (3) of the pipetting head (4) with an image capture device (5) comprising a sensor (6) by moving the pipetting head (4) and/or the sensor (6) relative to one another,
    send the acquired data from scanning the one or more adapters (3) to the data processor (7),
    calculate positions of the one or more adapters (3) in relation to the pipetting head (4), and
    use this information to calculate the alignment of the one or more pipetting tips (2) with respect to the one or more adapters (3) of the pipetting head (4).

12. A contactless measurement system (10) for measuring the alignment of one or more pipetting tips (2) in an automated pipetting system (1) comprising:
    one or more adapters (3) on a pipetting head (4) connected to a robotic pipetting arm (11) for mounting the one or more pipetting tips (2),
    an image capture device (5) comprising a sensor (6) joined to a worktable (9) for capturing an image of the orifices (21) of the one or more pipetting tips (2) or of the one or more adapters (3) of the pipetting head (4),
    a mechanism for moving the pipetting head (4) and/or the sensor (6) relative to one another for scanning the orifices (21) at the protruding end of the one or more pipetting tips (2) or of the one or more adapters (3) of the pipetting head (4), and
    a data processor (7) for receiving the image data acquired by the sensor (6) and for calculating alignment information for the one or more pipetting tips (2) with respect to a virtual regular grid assumed to the pipetting head (4) mounting surface.

13. The contactless measurement system (10) according to claim 12, whereas the image capture device (5) comprises
    a light source (8) for illuminating the object to be scanned, and
    an optical subsystem reflecting the object to be scanned onto the sensor (6).

14. The contactless measurement system (10) according to claim 12, whereas the image capture device (5) is a flatbed document scanner.

15. The contactless measurement system (10) according to claim 12, whereas the contactless measurement system has an application for pipetting liquid samples, whereas the contactless measurement system (10) assists in analyzing the position of one or more pipetting tips (2) in an automated pipetting system (1).

16. An automated pipetting system (1) comprising a contactless measurement system (10) according to claim 12.

* * * * *